J. GROCHMAL.
ALCOHOL STOVE.
APPLICATION FILED SEPT. 25, 1919.
1,339,059.
Patented May 4, 1920.
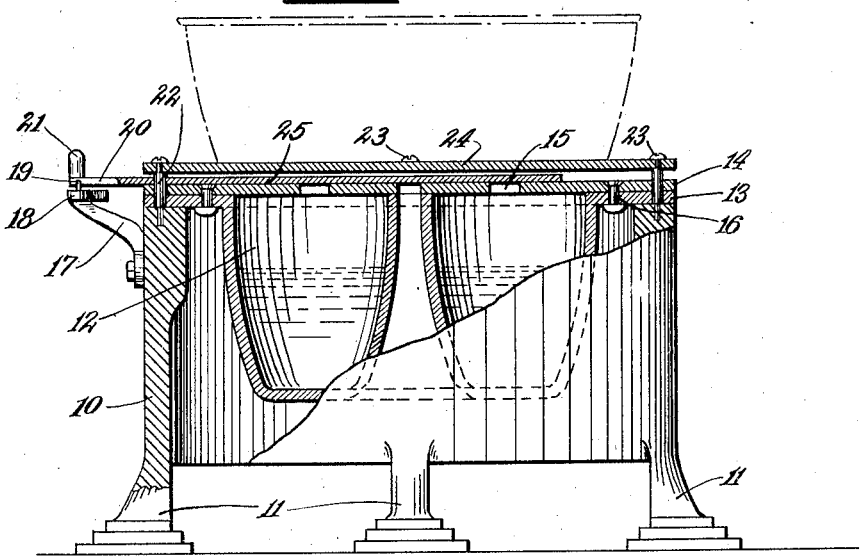
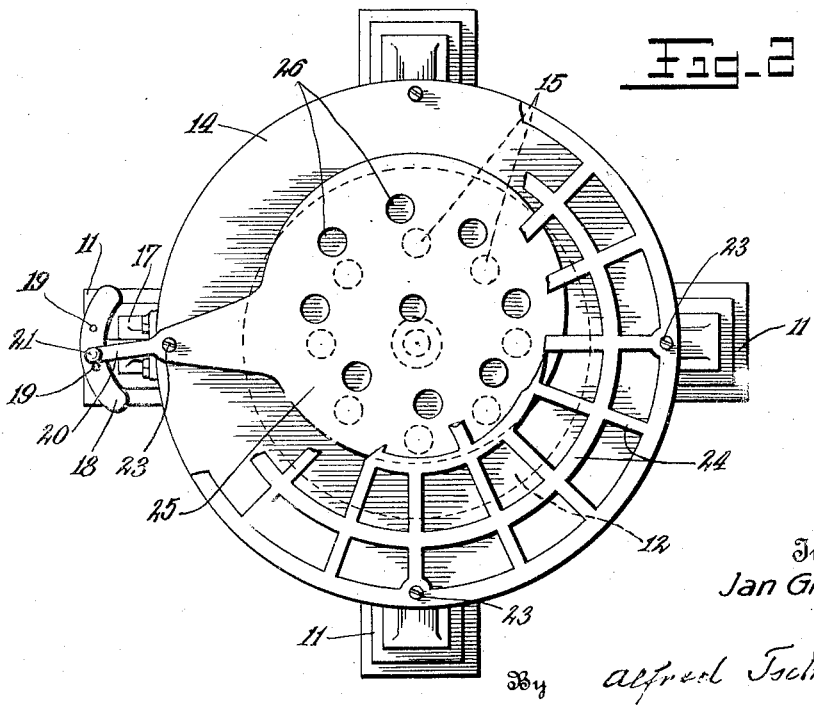
Inventor
Jan Grochmal
By Alfred Tschinkel
Attorney

UNITED STATES PATENT OFFICE.

JAN GROCHMAL, OF CHICOPEE, MASSACHUSETTS.

ALCOHOL-STOVE.

1,339,059. Specification of Letters Patent. Patented May 4, 1920.

Application filed September 25, 1919. Serial No. 326,306.

*To all whom it may concern:*

Be it known that I, JAN GROCHMAL, a citizen of Poland, residing at Chicopee, county of Hampden, and State of Massachusetts, have invented certain new and useful Improvements in Alcohol-Stoves, of which the following is a specification.

This invention has for its object to provide a stove adapted to use alcohol or other liquid combustible on which may be heated vessels containing food and the like for various purposes.

A further object is to provide a shutter plate combined with the upper portion of the stove whereby the heat emanating from the flames may be readily controlled.

These objects are attained by the novel construction and combination of parts hereinafter described and shown in the accompanying drawings, forming a material part of this disclosure, and in which:—

Figure 1 is a partial side elevational and partial vertical sectional view showing an alcohol stove made in accordance with the invention, having two chambers and Fig. 2 is a top plan view of the device with one of the chambers, parts being broken away in order to show the construction.

Referring to the drawings in detail, a cylindrical casing 10 is supported by standards 11, the same resting upon a table or other level surface convenient of access. In order to obtain the best results from the vapor of a burning liquid, the same is contained within each of the two chambers 12, (Fig. 1). As the chambers 12 are constructed alike, the description of one of the same will be sufficient for the understanding of the construction of each, each chamber is formed with an outwardly extending flange or plate 13, resting upon the upper edge of the cylindrical casing 10, the chamber being of oval cross section, having a flat bottom and spaced from the walls of the casing, as best shown in Fig. 1.

Arranged over the chamber is a plate 14, containing a plurality of equally spaced openings 15, the plates being held together in a rigid manner by rivets 16. Secured to the wall of the casing 10 is a bracket 17, carrying a segment 18, in which are set a pair of pins 19, limiting the movement of a lever 20, provided with an operating handle 21, the lever being pivoted upon a spacing sleeve 22, through which passes one of the securing screws 23, used in holding in position on top of the stove a grate cover 24, upon which vessels may be placed when being heated.

Extending oppositely from the pivot 23 and formed with the lever 20, is a disk 25, containing a plurality of openings 26, which may be caused to register with the corresponding openings 15, upon operating the extending knob 21. Thus when the openings 15 register with the openings 26, vapors may rise therethrough, or the shutter plate 25 may be fully closed preventing the flame from rising or the openings may be graduated to any desired degree.

In operation, when the chamber 12 is partially filled with the inflammable liquid, a flame or spark is applied to the openings in the grate 24 underneath of the vessel resting thereon, and by properly manipulating the knob 21 any desired degree of heat may be obtained within the capacity of the stove.

Having thus described my invention what I claim as new and desire to secure by Letters Patent, is—

An alcohol stove comprising a cylindrical walled casing, standards on which said casing is supported, a plate fixed upon the upper end of said casing, a fuel chamber formed with said plate extending downward in said casing, the section of said fuel chamber being substantially conical, a cover plate engaged over said fixed plate, said cover plate containing a plurality of uniformly spaced apertures, an apertured shutter plate pivoted on said casing, the openings of which are adapted to register with the openings through said fixed plate, means for actuating said shutter plate, a grate arranged thereover upon which vessels may be disposed, a bracket extending from said cylindrical casing, a segment secured on the upper end of said bracket, pins set in said segment, a lever extending from said shutter plate operative between said pins, and means for actuating said lever.

In testimony whereof I have affixed my signature.

JAN GROCHMAL.